(12) United States Patent
Nanba et al.

(10) Patent No.: US 7,638,202 B2
(45) Date of Patent: Dec. 29, 2009

(54) STRETCHED POLYAMIDE FILMS

(75) Inventors: Hiroyuki Nanba, Kanagawa (JP); Kenji Kouno, Kanagawa (JP); Atsushi Nakagawa, Mie (JP)

(73) Assignees: Mitsubishi Gas Chemical Company, Inc., Tokyo (JP); Mitsubishi Chemical Corporation, Tokyo (JP)

( * ) Notice: Subject to any disclaimer, the term of this patent is extended or adjusted under 35 U.S.C. 154(b) by 224 days.

(21) Appl. No.: 11/524,266

(22) Filed: Sep. 21, 2006

(65) Prior Publication Data
US 2007/0065673 A1   Mar. 22, 2007

(30) Foreign Application Priority Data
Sep. 21, 2005   (JP)   ............... 2005-273352

(51) Int. Cl.
*C08L 51/08* (2006.01)
(52) U.S. Cl. .................. 428/474.4; 428/474.7; 525/63; 525/66
(58) Field of Classification Search .............. 428/474.4, 428/474.7; 525/63, 66
See application file for complete search history.

(56) References Cited

U.S. PATENT DOCUMENTS

| | | | |
|---|---|---|---|
| 4,957,980 A * | 9/1990 | Kobayashi et al. .......... | 525/425 |
| 5,164,445 A | 11/1992 | Nishida et al. | |
| 2002/0128591 A1 * | 9/2002 | Kleiner et al. ................ | 604/20 |
| 2002/0142179 A1 * | 10/2002 | Nanba et al. ............. | 428/474.4 |
| 2003/0059606 A1 | 3/2003 | Iijima et al. | |
| 2003/0190489 A1 * | 10/2003 | Mitadera et al. ......... | 428/474.4 |
| 2004/0006182 A1 | 1/2004 | Omori | |
| 2004/0013833 A1 | 1/2004 | Lee et al. | |
| 2006/0210743 A1 * | 9/2006 | Bekele ..................... | 428/35.7 |

FOREIGN PATENT DOCUMENTS

| | | |
|---|---|---|
| EP | 1 229 067 | 8/2002 |
| EP | 1 239 008 | 9/2002 |
| EP | 1 350 806 | 10/2003 |
| JP | 05-193081 | 8/1983 |
| JP | 03-021851 | 1/1991 |
| JP | 03-021854 | 1/1991 |
| JP | 05-000492 | 1/1993 |
| JP | 05-077373 | 3/1993 |
| JP | 05-104689 | 4/1993 |
| JP | 07-117198 | 5/1995 |
| JP | 07-276591 | 10/1995 |
| JP | 08-165427 | 6/1996 |
| JP | 08-224844 | 9/1996 |
| JP | 2000-169603 | 6/2000 |
| WO | WO 90/09409 | 8/1990 |
| WO | WO 01/09245 | 2/2001 |

OTHER PUBLICATIONS

Nishida et al., translation of JP 04-091164, Mar. 1992.*
European Search Report dated Dec. 5, 2006, for European application No. 06120600.

* cited by examiner

*Primary Examiner*—Jeffrey C Mullis
(74) *Attorney, Agent, or Firm*—Antonelli, Terry, Stout & Kraus, LLP.

(57) ABSTRACT

A stretched polyamide film including at least one stretched layer made of a mixed resin containing a polyamide resin and a modified polyester-based elastomer Y. The polyamide resin X is mainly constituted by m-xylylenediamine unit and $C_{6-12}$ α,ω-aliphatic dicarboxylic acid unit. The modified polyester-based elastomer is graft-modified with an ethylenically unsaturated carboxylic acid or its anhydride. Such stretched polyamide film is drastically improved in the flexibility, impact resistance and pin-hole resistance with little reduction in the gas-barrier properties while retaining an enough transparency to practical use.

18 Claims, No Drawings

STRETCHED POLYAMIDE FILMS

BACKGROUND OF THE INVENTION

1. Field of the Invention

The present invention relates to a gas-barrier, stretched polyamide film resistant to boiling treatment and retort treatment, which is excellent in flexibility, impact resistance, pin-hole resistance, and transparency.

2. Description of the Prior Art

Multi-layered films having a gas-barrier layer made of poly(vinylidene chloride) (PVDC), ethylene-vinyl alcohol copolymer (EVOH), polyamide, etc. have been used as gas-barrier packaging materials. Of various types of polyamides, a m-xylylene group-containing polyamide obtainable by the polycondensation of m-xylylenediamine and a $C_{6-12}$ α,ω-aliphatic dicarboxylic acid, as compared with other types of gas-barrier resins, is characterized by a little reduction in the gas-barrier properties and a quick recovery of the gas-barrier properties upon boiling treatment and retort treatment. Particularly, poly(m-xylylene adipamide) obtainable using adipic acid as the $C_{6-12}$ α,ω-aliphatic dicarboxylic acid (hereinafter optionally referred to as "Nylon MXD6") is excellent in such characteristics and now comes to be widely used in the field of packaging.

Although Nylon MXD6 is low in the impact resistance, flexibility and pin-hole resistance in the non-stretched state, these properties can be improved to some extent by stretching. However, a sufficient improvement was not obtained for Nylon MXD6 alone, and therefore, other techniques for a further improvement have been demanded. To meet such demand, proposed is the addition of an additive material to Nylon MXD6, for example, the addition of polyolefin (JP 5-77373A), the addition of a modified polyolefin (Japanese Patents 3021854 and 3021851), the addition of an ionomer (JP 5-193081A, JP 7-117198A and JP 7-276591A), the addition of an polyamide elastomer (JP 8-224844A and JP 8-165427A), and the addition of a styrene-butadiene copolymer (JP 2000-169603A). Also proposed is the addition of a modified polyester elastomer to Nylon MXD6 (WO 90/09409). The resultant composition is taught to be excellent in the flexibility, chemical resistance, oil resistance, and moldability and suitable for automotive parts and electric machine parts.

However, any of the proposed methods described above fails to provide a sufficient impact resistance, flexibility and pin-hole resistance. Also, the addition of an elastomer causes the reduction of the gas-barrier properties and transparency. Particularly, in the method of JP 2000-169603A adding a styrene-butadiene copolymer, the improvement in the impact resistance is still further demanded.

SUMMARY OF THE INVENTION

An object of the present invention is to provide a gas-barrier, stretched polyamide film which is drastically improved in the flexibility, impact resistance and pin-hole resistance with little reduction in the gas-barrier properties while retaining an enough transparency to practical use.

The inventors have made extensive research on the improvement in the impact resistance of the film made of a m-xylylene group-containing polyamide by blending other types of resins. As result thereof, it has been found that a stretched film obtained from a blend of a m-xylylene group-containing polyamide and a modified polyester-based elastomer which is graft-modified with an ethylenically unsaturated carboxylic acid is drastically improved in the flexibility, impact resistance and pin-hole resistance with little reduction in the gas-barrier properties while retaining an enough transparency to practical use and suitable as a gas-barrier layer. The present invention is based on this finding.

Thus, the present invention relates to a stretched polyamide film including at least one stretched gas-barrier layer which is made of a mixed resin Z containing from 80 to 99% by weight of a polyamide resin X and from 20 to 1% by weight of a modified polyester-based elastomer Y, the polyamide resin X being constituted by a diamine constitutional unit containing 70 mol % or more of m-xylylenediamine unit and a dicarboxylic acid constitutional unit containing 70 mol % or more of a $C_{6-12}$ α,ω-aliphatic dicarboxylic acid unit, and the modified polyester-based elastomer Y being graft-modified with an ethylenically unsaturated carboxylic acid.

Since the stretched polyamide film of the present invention has at least one stretched layer made of the mixed resin Z composed of the polyamide resin X and the modified polyester-based elastomer Y, it is excellent in the transparency, impact resistance, pin-hole resistance, and gas-barrier properties. The stretched polyamide film is also well resistant to a boiling treatment or retort treatment. Therefore, the stretched polyamide film is suitable as the packaging materials for food, medicines, industrial chemicals, inks, etc. Being excellent particularly in the transparency, the stretched polyamide film is particularly suitable for the transparent food packaging because of the high capability of distinguishing its contents.

DETAILED DESCRIPTION OF THE INVENTION

The polyamide resin X used in the present invention is constituted by a diamine constitutional unit and a dicarboxylic acid constitutional unit, in which 70 mol % or more of the diamine constitutional unit is m-xylylenediamine unit, and 70 mol % or more of the dicarboxylic acid constitutional unit is $C_{6-12}$ α,ω-aliphatic dicarboxylic acid unit. The polyamide resin X is produced, for example, by the polycondensation of a diamine component containing 70 mol % or more of m-xylylenediamine and a dicarboxylic acid component containing 70 mol % or more of a $C_{6-12}$ α,ω-aliphatic dicarboxylic acid.

When the content of the m-xylylenediamine unit in the diamine constitutional unit is within the above range, good gas-barrier properties can be obtained. The content of the m-xylylenediamine unit is preferably 90 mol % or more and more preferably 100 mol %. The diamine other than m-xylylenediamine may include p-xylylenediamine, o-xylylenediamine, bis(aminomethyl)cyclohexane, tetramethylenediamine, pentamethylenediamine, hexamethylenediamine, heptamethylenediamine, octamethylenediamine, nonamethylenediamine, o-phenylenediamine, m-phenylenediamine, and p-phenylenediamine.

When the content of the $C_{6-12}$ α,ω-aliphatic dicarboxylic acid unit in the dicarboxylic acid constitutional unit is within the above range, the polyamide resin X acquires enough properties to practical use. The content of the $C_{6-12}$ α,ω-aliphatic dicarboxylic acid unit is preferably 70 mol % or more and more preferably 100 mol %. Examples of the $C_{6-12}$ α,ω-aliphatic dicarboxylic acid include adipic acid and sebacic acid. These dicarboxylic acids may be used alone or in combination of two or more. In view of high gas-barrier properties of the polyamide resin X, adipic acid is particularly preferably used as the dicarboxylic acid component. The dicarboxylic acid other than the $C_{6-12}$ α,ω-aliphatic dicarboxylic acid may include aromatic carboxylic acid such as isophthalic acid and terephthalic acid.

The modified polyester-based elastomer Y used in the present invention is a polyester-based elastomer which is graft-modified with an ethylenically unsaturated carboxylic acid (inclusive of its anhydride), preferably an α,β-ethylenically unsaturated carboxylic acid (inclusive of its anhydride) and can be produced by graft-polymerizing the ethylenically unsaturated carboxylic acid to a polyester-based elastomer.

The polyester-based elastomer to be graft-modified is preferably a saturated polyester-based elastomer and more preferably a saturated polyester-based elastomer having a polyalkylene ether glycol segment. For example, preferred is a polyester-based elastomer composed of an aromatic polyester segment as the hard segment and a polyalkylene ether glycol or aliphatic polyester segment as the soft segment. Particularly preferred is a polyester polyether block copolymer having a polyalkylene ether glycol segment as the soft segment. The content of the polyalkylene ether glycol segment is in a range in which the lower limit is preferably 5% by weight, more preferably 30% by weight, and still more preferably 50% by weight, and the upper limit is preferably 90% by weight, more preferably 80% by weight, and still more preferably 77% by weight, each based on the weight of the block copolymer produced. The content equal to or less than the above upper limit is preferred in view of the hardness and mechanical strength, and the content equal to or more than the above lower limit is preferred in view of the flexibility and impact resistance. The content of the polyalkylene ether glycol segment can be calculated from the chemical sifts of hydrogen atoms and their contents measured by nuclear magnetic resonance spectrometry (NMR).

Preferred as the polyester polyether block copolymer are those produced by the polycondensation of oligomer which is produced by the esterification or ester exchange reaction of (i) an aliphatic diol and/or alicyclic diol each having from 2 to 12 carbon atoms, (ii) an aromatic dicarboxylic acid and/or alicyclic dicarboxylic acid (each inclusive of alkyl ester), and (iii) a polyalkylene ether glycol.

As the aliphatic diol and/or alicyclic diol each having from 2 to 12 carbon atoms, usable are those which are generally used as the raw materials for polyester, particularly, for polyester-based elastomer. Examples thereof include ethylene glycol, propylene glycol, trimethylene glycol, 1,4-butane diol, 1,4-cyclohexanediol, and 1,4-cyclohexanedimethanol, with 1,4-butane diol or ethylene glycol being preferred and 1,4-butane diol being particularly preferred. These diols may be used in combination of two or more.

As the aromatic dicarboxylic acid, usable are those which are generally used as the raw materials for polyester, particularly, for polyester-based elastomer. Examples thereof include terephthalic acid, isophthalic acid, phthalic acid, and 2,6-naphthalenedicarboxylic acid, with terephthalic acid or 2,6-naphthalenedicarboxylic acid being preferred and terephthalic acid being particularly preferred. These aromatic dicarboxylic acids may be used in combination of two or more. Examples of the alkyl esters of the aromatic dicarboxylic acids include dimethyl esters and diethyl esters of the aromatic dicarboxylic acids recited above, with dimethyl terephthalate and dimethyl 2,6-naphthalenedicarboxylate being preferred.

The alicyclic dicarboxylic acid is preferably cyclohexanedicarboxylic acid, and its alkyl ester is preferably a dimethyl ester or a diethyl ester.

In addition to the above components, a small amount of a tri-functional alcohol, tricarboxylic acid, or its ester may be used as a comonomer. Also, an aliphatic dicarboxylic acid such as adipic acid or its dialkyl ester may be used as a comonomer.

The number-average molecular weight of the polyalkylene ether glycol is in a range in which the lower limit is preferably 400, more preferably 500 and still more preferably 600, and the upper limit is preferably 6,000, more preferably 4,000 and still more preferably 3,000. The number-average molecular weight equal to or more than the above lower limit is preferred in view of the block-forming properties of copolymer. When equal to or less than the above upper limit, the phase separation of the reaction system hardly occurs to allow the polymer properties to easily emerge. The number-average molecular weight referred to herein is measured by gel permeation chromatography (GPC). A polytetrahydrofuran calibration kit available from Polymer Laboratories Ltd. (UK) can be used for the calibration of GPC.

Examples of the polyalkylene ether glycol include polyethylene glycol, poly(1,2-propylene ether) glycol, poly(1,3-propylene ether) glycol, poly(tetramethylene ether) glycol, and poly(hexamethylene ether) glycol. Such polyalkylene ether glycol is commercially available under tradenames of "Primalloy" (Mitsubishi Chemical Corporation), "Pelprene" (Toyobo Co., Ltd.), "Hytrel" (Du Pont-Toray Co., Ltd.), etc.

Examples of the ethylenically unsaturated carboxylic acid and its anhydride used in the present invention include unsaturated carboxylic acids such as acrylic acid, maleic acid, fumaric acid, itaconic acid, citraconic acid, crotonic acid, and isocrotonic acid; and unsaturated carboxylic anhydrides such as (2-octene-1-yl)succinic anhydride, (2-dodecene-1-yl)succinic anhydride, (2-octadecene-1-yl)succinic anhydride, maleic anhydride, 2,3-dimethylmaleic anhydride, bromomaleic anhydride, dichloromaleic anhydride, citraconic anhydride, itaconic anhydride, 1-butene-3,4-dicarboxylic acid anhydride, 1-cyclopentene-1,2-dicarboxylic acid anhydride, 1,2,3,6-tetrahydrophthalic anhydride, 3,4,5,6-tetrahydrophthalic anhydride, exo-3,6-epoxy-1,2,3,6-tetrahydrophthalic anhydride, 5-norbornene-2,3-dicarboxylic anhydride, methyl-5-norbornene-2,3-dicarboxylic anhydride, endo-bicyclo[2.2.2]oct-5-ene-2,3-dicarboxylic anhydride, and bicyclo[2.2.2]oct-7-ene-2,3,5,6-tetracarboxylic anhydride, with the α,β-ethylenically unsaturated carboxylic acid and its anhydride being preferred and the anhydride being more preferred because of their high reactivity.

The ethylenically unsaturated carboxylic acid and its anhydride are suitably selected according to the type of the polyester-based elastomer to be modified and the modification conditions and may be used in combination of two or more. The ethylenically unsaturated carboxylic acid and its anhydride may be used in the form of a solution in an organic solvent.

The modification reaction is effected by allowing the ethylenically unsaturated carboxylic acid as the modifier to react with the polyester-based elastomer. The modification reaction is initiated preferably by a radical generator. In the modification reaction, the graft reaction of the ethylenically unsaturated carboxylic acid or its anhydride to the polyester-based elastomer mainly occurs with a small degree of the decomposition. Therefore, the molecular weight of the modified polyester-based elastomer decreases, to lower its melt viscosity. Also, the modification reaction may be accompanied with other reactions such as ester exchange reaction. Therefore, the resultant reaction product generally contains the non-reacted starting materials, but, it is preferred that the reaction product contains only the modified polyester-based elastomer. When the reaction product contains two or more components, the content of the modified polyester-based elastomer is preferably 10% by weight or more and more preferably 30% by weight or more.

Examples of the radical generator include organic or inorganic peroxides such as t-butyl hyroperoxide, cumene hyroperoxide, 2,5-dimethylhexane 2,5-dihyroperoxide, 2,5-dimethyl-2,5-bis(t-butyloxy)hexane, 3,5,5-trimethylhexanoyl peroxide, t-butyl peroxybenzoate, benzoyl peroxide, dicumyl peroxide, 1,3-bis(t-butylperoxyisopropyl)benzene, dibutyl peroxide, methyl ethyl ketone peroxide, potassium peroxide, and hydrogen peroxide; azo compounds such as 2,2'-azobisisobutyronitrile, 2,2'-azobis(isobutylamide)dihalide, 2,2'-azobis[2-methyl-N-(2-hydroxyethyl)propionamide], and azodi-t-butane; and carbon radical generators such as dicumyl.

The radical generators recited above are suitably selected according to the type of the polyester-based elastomer to be modified, the type of the ethylenically unsaturated carboxylic acid or its anhydride and the modification conditions, and may be used in combination of two or more. The radical generator may be used in the form of a solution in an organic solvent.

The modification reaction for producing the modified polyester-based elastomer is performed by a known method such as a melt kneading method, solution method and suspended dispersion method, with the melt kneading method being generally preferred because of its low costs.

In case of the melt kneading method, the starting components are uniformly mixed in a predetermined blending ratio and then the resultant mixture is melt-kneaded. Henschel mixer, ribbon blender, or V-shape blender is used for the mixing, and Banbury mixer, kneader, roll, or single- or multi-screwed kneading extruder is used for the melt kneading.

The melt kneading is performed so as to avoid the thermal degradation of the resins in a temperature range in which the lower limit is preferably 100° C., more preferably 120° C. and still more preferably 150° C., and the upper limit is preferably 300° C., more preferably 280° C. and still more preferably 250° C.

The ethylenically unsaturated carboxylic acid or its anhydride is blended with 100 parts by weight of the polyester-based elastomer in a range in which the lower limit is preferably 0.01 part by weight, more preferably 0.05 part by weight and still more preferably 0.1 part by weight, and the upper limit is preferably 30 parts by weight, more preferably 5 parts by weight and still more preferably 1 part by weight. A sufficient modification is obtained when the blending amount is equal to or more than the above lower limit, and a blending amount equal to or less than the above upper limit is preferred in view of production costs.

The radical generator is blended with 100 parts by weight of the polyester-based elastomer in a range in which the lower limit is preferably 0.001 part by weight, more preferably 0.005 part by weight and still more preferably 0.01 part by weight, and the upper limit is preferably 3 parts by weight, more preferably 0.5 part by weight, still more preferably 0.2 part by weight and particularly preferably 0.1 part by weight. A sufficient modification is obtained when the blending amount is equal to or more than the above lower limit, and the deterioration of material strength due to the decrease in the molecular weight (decrease in the viscosity) hardly occurs when the blending amount is equal to or less than the above upper limit.

JIS-D hardness (hardness measured according to JIS K6253 using a durometer type D) of the reaction product containing the modified polyester-based elastomer Y is in a range in which the lower limit is preferably 10, more preferably 15 and still more preferably 20, and the upper limit is preferably 80, more preferably 70 and still more preferably 60. JIS-D hardness equal to or more than the above lower limit is preferred in view of the mechanical strength, and JIS-D hardness equal to or less than the above upper limit is preferred in view of the flexibility and impact resistance.

The modification ratio (graft ratio) of the modified polyester-based elastomer Y is determined from a $^1$H-NMR spectrum by calculating the following formula:

$$\text{Graft ratio (\% by weight)} = 100 \times (C \div 3 \times 98) / \{(A \times 148 \div 4) + (B \times 72 \div 4) + (C \div 3 \times 98)\}$$

wherein A is an integrated value of the peaks from 7.8 to 8.4 ppm, B is an integrated value of the peaks from 1.2 to 2.2 ppm, and C is an integrated value of the peaks from 2.4 to 2.9 ppm.

The $^1$H-NMR measurement is conducted, for example, by "GSX-400" manufactured by JEOL, Ltd.

The modification ratio (graft ratio) of the modified polyester-based elastomer Y determined in the above manner is in a range in which the lower limit is preferably 0.01% by weight, more preferably 0.03% by weight and still more preferably 0.05% by weight, and the upper limit is preferably 10% by weight, more preferably 7% by weight and still more preferably 5% by weight. When the graft ratio is equal to or more than the above lower limit, the affinity with polyamide is preferably enhanced, and the deterioration of the strength due to the molecular degradation during the modification can be minimized when the graft ratio is equal to or less than the above upper limit.

The modified polyester-based elastomer Y may be included with a rubber component such as natural rubber and synthetic rubber (for example, polyisoprene rubber) and a softening agent such as process oil. The softening agent is added to promote the plasticization of the rubber component and enhance the fluidity of the thermoplastic resin composition to be obtained. The softening agent may be paraffin-based, naphthene-based or aromatic-based. In addition to the rubber component and softening agent, the modified polyester-based elastomer Y may be further included with other resins, other rubber components, fillers, additives, etc. as far as the effect of the present invention is not adversely affected. Examples of the filler include calcium carbonate, talc, silica, kaolin, clay, diatomaceous earth, calcium silicate, mica, asbestos, alumina, barium sulfate, aluminum sulfate, calcium sulfate, magnesium carbonate, carbon fibers, glass fibers, glass beads, molybdenum sulfide, graphite, and shirasu-balloon. Examples of the additive include heat stabilizers, weathering agents, colorants, antistatic agents, fire retardants, nucleating agents, lubricants, slip agents, and anti-blocking agents. Known heat stabilizers of phenol-type, phosphorus-type, sulfur-type and other types are usable. Known weathering agents of hindered amine-type, triazole-type and other types are usable. The colorant may be selected from carbon black, titanium white, zinc white, red oxide, azo compounds, nitroso compounds, phthalocyanine compounds, etc. The antistatic agent, fire retardant, nucleating agent, lubricant, slip agent, and anti-blocking agent may be selected from those known in the art.

The mixed resin Z is a mixture obtained by mixing the polyamide resin X and the modified polyester-based elastomer Y in the following mixing ratio X/Y (weight basis) wherein the contents of the polyamide resin X and modified polyester-based elastomer Y add up to 100% by weight. The mixing ratio X/Y is in a range in which the lower limit is preferably 80/20, more preferably 90/10, still more preferably 92.5/7.5 and particularly preferably 95/5, and the upper limit is preferably 99/1, more preferably 98/2, and still more preferably 97.5/2.5 and particularly preferably 97/3. A mixing ratio X/Y equal to or less than the above upper limit is preferred in view of the impact resistance, while a mixing ratio X/Y equal to or more than the above lower limit is preferred in view of the gas-barrier properties and transparency as well as in view of preventing the brake during the stretching operation.

To improve the flexibility and impact resistance of the film, the mixed resin Z may be included with an aliphatic polyamide X* in addition to the polyamide resin X, if necessary. Examples of the aliphatic polyamide X* include nylon 6, nylon 66 and nylon 6-66, and an amorphous nylon is also usable. The mixing ratio of the polyamide resin X and the aliphatic polyamide X* (X/X*) by weight basis is preferably from 50/50 to 99/1 wherein the contents of the polyamide resin X and aliphatic polyamide X* add up to 100% by weight, because sufficient gas-barrier properties can be maintained and the flexibility can be easily improved.

The mixed resin Z may further contain, if necessary, an antistatic agent, a lubricant, an anti-blocking agent, a stabilizer, a dye, a pigment, etc. Although depending upon the type of the additive, the blending amount of the additive such as the antistatic agent and lubricant is preferably from 0.1 to 5% by weight of the mixed resin Z in view of obtaining the effect of the additive. In addition, the mixed resin Z may further contain an additional component other than those described above as far as the effect of the present invention is not adversely affected. If such additional component is included, the total amount of the polyamide resin X and the modified polyester-based elastomer Y is preferably 80% by weight or more, more preferably 90% by weight or more, and still more preferably 95% by weight or more based on the amount of the mixed resin Z.

The stretched polyamide film of the present invention includes at least one stretched layer made of the mixed resin Z, and may be a multi-layered, stretched polyamide film optionally having a stretched layer made of the aliphatic polyamide X* on either one or both surfaces of the stretched layer made of the mixed resin Z.

The stretched polyamide film is produced, for example, by melt-kneading and extruding the mixed resin Z into the form of a film (as-extruded film) and then stretching the film. The mixed resin Z to be extruded may be prepared by dry-blending the polyamide resin X and the modified polyester-based elastomer Y or by melt-kneading these components in a single- or multi-screw extruder. In case of optionally laminating the stretched layer made of the aliphatic polyamide X*, the mixed resin Z and the optional aliphatic polyamide X* are co-extruded into the form of a multi-layered film (as-extruded film) which is then stretched. Alternatively, a stretched film made of the mixed resin Z and a stretched film made of the aliphatic polyamide X* which have been produced separately are laminated by a heat press or adhesive. The production of the as-extruded film by the extrusion of the mixed resin Z optionally together with the optional aliphatic polyamide X* can be effected by a known film-forming method such as T-die method and cylindrical die method (inflation method).

The thickness of the stretched film (stretched layer made of the mixed resin Z) is in a range in which the lower limit is preferably 5 μm, more preferably 10 μm and still more preferably 12 μm, and the upper limit is preferably 50 μm, more preferably 40 μm and still more preferably 30 μm. Within the above range, the stretched polyamide film is preferably applicable to the barrier layer for use in packaging materials, particularly, food packaging materials. In a multi-layered, stretched polyamide film, the thickness of the stretched layer made of the aliphatic polyamide X* is preferably from 10 to 100 μm in many cases.

The stretched polyamide film of the present invention preferably has the following properties. In a most preferred embodiment, the gas-barrier properties expressed by an oxygen transmission rate is zero ml/(m$^2$·day·MPa), and the upper limit of the oxygen transmission rate is preferably 200 ml/(m$^2$·day·MPa), more preferably 100 ml/(m$^2$·day·MPa), and still more preferably 70 ml/(m$^2$·day·MPa). In a most preferred embodiment, the transparency expressed by a haze value is zero %/15 μm, and the upper limit of the haze value is preferably 8%/15 μm, more preferably 6%/15 μm, still more preferably 5%/15 μm, and particularly preferably 4%/15 μm. In a most preferred embodiment, the flexibility expressed by the number of pin-holes after a pin-hole resistance test is zero hole/500 flexings, and the upper limit of the number of pin-holes is preferably 5 holes/500 flexings, more preferably 3 holes/500 flexings, and still more preferably 1 hole/500 flexings. A higher impact resistance is preferred, and the lower limit of the impact puncture strength is preferably 8 kg·cm, more preferably 10 kg·cm, and still more preferably 15 kg·cm. The measuring method of each property will be described below.

The melt extrusion of the mixed resin Z and the optional aliphatic polyamide X* is performed preferably at 250 to 290° C. and more preferably at 250 to 270° C. When the extrusion temperature is equal to or less than the above upper limit, the decomposition, gelation, discoloration and foaming are preferably avoided. The extruded film is stretched by a monoaxial stretching, simultaneous biaxial stretching or successive biaxial stretching, with the biaxial stretching being preferred because of the easiness of uniform orientation.

The stretching ratio in the machine direction (MD), the transverse direction (TD) or both directions is in a range in which the lower limit is preferably 2 times, more preferably 2.5 times and still more preferably 3 times, and the upper limit is preferably 5 times, more preferably 4.5 times and still more preferably 4 times. When the stretching ratio is equal to or less than the above upper limit, good gas-barrier properties are easily obtained. When equal to or more than the above lower limit, the effect of stretching is easier to emerge and the gas-barrier properties and mechanical properties are easily improved.

The stretching temperature of the film made of the mixed resin Z alone or together with the optional film made of the aliphatic polyamide X* is in a range in which the lower limit is preferably 50° C. and more preferably 90° C., and the upper limit is preferably 120° C. and more preferably 110° C. Within the above range, the defective stretching and the whitening of film can be prevented. When the stretching temperature is equal to or higher than the above lower limit, the cold stretching and uneven stretching can be avoided. When equal to or lower than the above upper limit, the crystallization due to heating, the braking and the deterioration in the transparency can be avoided.

The stretched polyamide film exhibits a sufficient impact resistance and flexibility even when it is a single layer made of the mixed resin Z. To further improve the impact resistance, flexibility, and pin-hole resistance, the stretched polyamide film may be made into a multi-layered film by laminating a film made of the aliphatic polyamide X*. For example, a multi-layered, stretched polyamide film composed of outer layers made of nylon 6 and an inner layer made of the mixed resin Z (nylon 6/mixed resin Z/nylon 6) exhibits excellent gas-barrier properties, flexibility, and transparency, and therefore, is suitable for packaging material for foods.

In practical applications, the stretched polyamide film of the present invention is generally used as a gas-barrier layer of a multi-layered, gas-barrier film.

Such multi-layered, gas-barrier film is produced by laminating the single- or multi-layered, stretched polyamide film with at least one stretched or non-stretched film which is separately produced from polyolefin, polyester, adhesive resin, etc. by a heat press, an adhesive such as a polyurethane-based adhesive and an epoxy-based adhesive, etc.

A multi-layered, gas-barrier film can be also produced by stretching a multi-layered film (as-extruded film) which is produced by respectively extruding the mixed resin Z, optional aliphatic polyamide resin, adhesive resin and thermoplastic resin. The as-extruded film can be formed by a known method such as co-extrusion T-die method and co-extrusion cylindrical die method (inflation method). The multi-layered film (as-extruded film) is stretched by a mono-axial stretching, simultaneous biaxial stretching or successive biaxial stretching, with the biaxial stretching being preferred because of the easiness of uniform orientation. The stretching ratio in MD, TD or both directions is in a range in which the lower limit is preferably 2, more preferably 2.5 and still more preferably 3, and the upper limit is preferably 5, more preferably 4.5 and still more preferably 4. When the stretching ratio is equal to or less than the above upper limit, good gas-barrier properties are easily obtained. When equal to or more than the above lower limit, the effect of stretching is easier to emerge and the gas-barrier properties and mechanical properties are easily improved.

The extrusion temperature for forming the multi-layered film (as-extruded film) and the stretching temperature of the multi-layered film can be suitably determined with reference to those for the production of the single- or multi-layered, stretched polyamide film mentioned above.

The polyamide resin X included in the single- or multi-layered, stretched polyamide film or the multi-layered, gas-barrier film of the present invention is detectable by the melting point analysis by differential scanning calorimetry (DSC) or the analysis by infrared spectrometry (IR). The presence of the modified polyester-based elastomer Y can be confirmed by IR, etc.

The layered structure of the multi-layered, gas-barrier film may be generally a three-kind, three-layered structure such as A/B/C or a three-kind, five-layered structure such as C/B/A/B/C, although including other layered structures such as A/B/A/B/C according to the end applications, wherein A is a layer made of the single- or multi-layered, stretched polyamide film, B is a layer made of the adhesive resin B, and C is a layer made of the thermoplastic resin C. The thickness of layer B is preferably from 1 to 20 μm, and the thickness of layer C is preferably from 10 to 50 μm.

Examples of the thermoplastic resin C include low density polyethylene, high density polyethylene, linear low density polyethylene, polypropylene, polybutene, copolymers of these polymers, ionomer resin, ethylene-acrylic acid copolymer, ethylene-vinyl acetate copolymer, modified polyolefin resin, and mixtures thereof, with low density polyethylene, high density polyethylene, linear low density polyethylene, and polypropylene being preferred.

Examples of the adhesive resin B include graft-modified products of ethylene-vinyl acetate copolymer, high density polyethylene, low density polyethylene, linear low density polyethylene and polypropylene, each being graft-modified with maleic anhydride. A mixture based on such graft-modified product is also usable.

In the present invention, flashes, scraps and defective products generated in the production of the single- or multi-layered, stretched polyamide film and the multi-layered, gas-barrier film can be reused after crushing or reprocessing into pellets by a single- or twin-screw extruder. The reclaimed material can be reused as a layer solely made therefrom or by adding to one or more layers constituting the stretched polyamide film and the multi-layered, gas-barrier film according to the end applications, as far as such reuse does not adversely affect the effect of the present invention.

The stretched polyamide film (single- or multi-layered) and the multi-layered, gas-barrier film of the present invention show little reduction in the gas-barrier properties after the boiling treatment or retort treatment, and recovers the gas-barrier properties quickly. Therefore, the stretched polyamide film and the multi-layered, gas-barrier film are applicable to packaging materials fro processed meat food, boiled foods, retorted foods, and other objects.

The opening of packaging materials can be sealed by any manner such as heat sealing and ligation with a clip. A tubular film is cut into a desired length and used as the packaging material optionally after sealing one of the openings by heat sealing or ligation.

The present invention will be described in more detail with reference to the following examples and comparative examples. The materials, amounts of use, proportions, details of treatments, order of treatments, etc. may be suitably changed or modified without departing from the spirit of the invention. The following examples are given solely for the purpose of illustration and are not to be construed as limitations to the scope of the present invention.

The measurements and evaluations were made by the following methods.

(1) Haze Value

Measured according to ASTM D1003 using a haze/turbidimeter "COH-300A" manufactured by Nippon Denshoku Industries Co., Ltd.

(2) Oxygen Transmission Rate

Measure according to ASTM D3985 at 23° C. and a relative humidity of 60% using an oxygen permeation tester "OX-TRAN 10/50A" manufactured by Modern Controls, Inc.

(3) Impact Puncture Strength

Measured according to ASTM D781 at 23° C. and a relative humidity of 50% using a film impact tester "ITF-60" manufactured by Tosoku Seimitsu Kogyo Co., Ltd.

(4) Flexibility (Pin-Hole Resistance)

A sample film was repeatedly flexed in the predetermined number of times at 23° C. and a relative humidity of 50% using a Gelbo flex tester manufactured by Rigaku Kogyo Co., Ltd. The number of pin-holes was counted using a pin-hole tester.

EXAMPLE 1

A mixed resin was prepared by dry-blending 95 parts by weight of the following polyamide resin and 5 parts by weight of the following modified polyester-based elastomer.

Polyamide resin: Nylon MXD6 ("MX Nylon 6007" tradename of Mitsubishi Gas Chemical Company, Inc.) constituted by m-xylylenediamine unit as the diamine constitutional unit and adipic acid unit as the dicarboxylic acid constitutional unit.

Modified polyester-based elastomer: "Primalloy-AP IF138" tradename of Mitsubishi Chemical Corporation (JIS hardness: 35; Modification ratio: 0.34), produced by the reaction of a polyester elastomer containing 65 parts by weight of polytetramethylene ether glycol (molecular weight: 2000) with 0.5 part by weight of maleic anhydride in the presence of 0.05 part by weight of a radical generator at 230° C.

The mixed resin was extruded at 260 to 270° C. from a twin screw extruder ("PTM30" manufactured by Plabor Co., Ltd., having a cylinder diameter of 30 mm) to form an as-extruded film having a thickness of 300 μm by a T-die/cooling roll method. The film thus obtained was stretched by a tenter method at 100° C. by four times in both of TD and MD using a biaxial stretching machine manufactured by Toyo Seiki Seisaku-Sho, Ltd., to obtain a biaxially stretched polyamide film of 15 μm thick. The results of the measurements and evaluations on the stretched polyamide film are shown in Table 1.

EXAMPLE 2

The stretched polyamide film (surface base film) prepared in Example 1 and a sealant film (50 μm thick LLDPE film "Unilax," tradename of Idemitsu Petrochemical Co., Ltd.) were dry-laminated through an adhesive (polyurethane-based adhesive manufactured by Toyo Morton Co., Ltd., containing a polyester-based basic material "AD-817" and a polyisocyanate curing agent "CAT-RT86"), to produce a multi-layered, gas-barrier film. The results of the measurements and evaluations on the multi-layered, gas-barrier film are shown in Table 2.

EXAMPLE 3

A linear low density polyethylene for forming layer C, an adhesive polyethylene for forming layer B and a mixed resin for forming layer A were extruded from respective extruders and superposed through a feed block, to prepare a molten multi-layered structure of C/B/A/B/C.
Layer C
  linear low density polyethylene: "Ultzex 2022L" manufactured by Mitsui Chemicals, Inc.
  cylinder diameter: 45 mm.
  extrusion temperature: 200 to 210° C.
Layer B
  adhesive polyethylene: "Admer NF300" manufactured by Mitsui Chemicals, Inc.
  cylinder diameter: 40 mm.
  extrusion temperature: 190 to 200° C.
Layer A
  mixed resin: prepared in the same manner as in Example 1.
  cylinder diameter: 30 mm.
  extrusion temperature: 260 to 270° C.

The molten multi-layered structure was made into a non-stretched multi-layered film by a cylindrical die/water-cooling inflation method. Then, the non-stretched multi-layered film was stretched simultaneously in both TD and MD at 100° C. by a tubular method (MD: three times; TD: four times) and heat-set, to produce a multi-layered, gas-barrier film. The results of the measurements and evaluations on the multi-layered, gas-barrier film are shown in Table 3.

EXAMPLE 4

Co-Extrusion, Co-stretching Process

A mixed resin for the gas-barrier layer was prepared by dry-blending 97 parts by weight of the following polyamide resin and 3 parts by weight of the following modified polyester-based elastomer.
  Polyamide resin: Nylon MXD6 ("MX Nylon 6011" tradename of Mitsubishi Gas Chemical Company, Inc., hereinafter referred to as "N-MXD6")
  Modified polyester-based elastomer: "Primalloy-AP IF138"

The mixed resin for forming layer V and poly-ε-caproamide ("Ube Nylon 1022FDX04" manufactured by Ube Corporation) for forming layer W were melted respectively in three 65 mmφ extruders at 255° C. The molten resins were laminated in the T-die and extruded into a three-layered laminate film (W/V/W). The extruded film was closely attached to a cast roll at 30° C. using a pinning machine and quenched, to obtain a multi-layered film of W/V/W=50/50/50 μm. The multi-layered film was then stretched in MD by three times by a roll stretching machine with a low-speed heating roll kept at 85° C. The film thus treated was held at its both sides by the tenter clips and stretched in TD by 3.3 times at 100 to 120° C. in the tenter oven. Then, the film was heat-set at 215° C. for 10 s, to obtain a multi-layered, gas-barrier film. The results of the measurements and evaluations on the multi-layered, gas-barrier film are shown in Table 4.

COMPARATIVE EXAMPLE 1

A stretched film was produced in the same manner as in Example 1 except for using only Nylon MXD6 ("MX Nylon 6007") in place of the resin mixture. The results of the measurements and evaluations on the stretched film are shown in Table 1.

COMPARATIVE EXAMPLE 2

A stretched film was produced in the same manner as in Example 1 except for using a mixed resin prepared by dry-blending 70 parts by weight of Nylon MXD6 ("MX Nylon 6007") and 30 part by weight of a modified polyester-based elastomer ("Primalloy-AP IF138"). The results of the measurements and evaluations on the stretched film are shown in Table 1.

COMPARATIVE EXAMPLE 3

A stretched film was produced in the same manner as in Example 1 except for using a styrene-based elastomer ("Tufftec M1943," tradename of Asahi Kasei Corporation) in place of the modified polyester-based elastomer ("Primalloy-AP IF138"). The results of the measurements and evaluations on the stretched film are shown in Table 1.

COMPARATIVE EXAMPLE 4

A laminate film was produced in the same manner as in Example 2 except for using the stretched film obtained in Comparative Example 1 as the surface base film. The results of the measurements and evaluations on the laminated film are shown in Table 2.

COMPARATIVE EXAMPLE 5

A multi-layered, stretched film was produced in the same manner as in Example 3 except for using only MXD6 ("MX Nylon 6007") in place of the mixed resin. The results of the measurements and evaluations on the multi-layered, stretched polyamide film are shown in Table 3.

COMPARATIVE EXAMPLE 6

A polyamide film was produced in the same manner as in Example 1 except for omitting the stretching. The results of the measurements and evaluations on the non-stretched polyamide film are shown in Table 1.

COMPARATIVE EXAMPLE 7

A multi-layered, stretched film was produced in the same manner as in Example 4 except for omitting the use of the modified polyester-based elastomer in the preparation of the mixed resin. The results of the measurements and evaluations on the multi-layered, stretched film are shown in Table 4.

TABLE 1

|  | Example 1 | Comparative Examples | | | |
|---|---|---|---|---|---|
|  |  | 1 | 2 | 3 | 6 |
| Blending ratio (by weight) | | | | | |
| polyamide resin X | 95 | 100 | 70 | 95 | 95 |
| modified polyester-based elastomer Y | 5 | 0 | 30 | 0 | 5 |
| styrene-based elastomer | 0 | 0 | 0 | 5 | 0 |
| Thickness (μm) | 15 | 15 | 15 | 15 | 15 |
| Stretching | done | done | done | done | omitted |
| Results of Evaluations | | | | | |
| haze value (%/15 μm) | 1.6 | 0.3 | 16.5 | 0.9 | 40.0 |
| oxygen transmission rate (ml/(m² · day · MPa)) | 36 | 33 | 200 | 44 | 70 |
| impact puncture strength (kg · cm) | 20.5 | 19.2 | 26.5 | 19.5 | 10.0 |
| number of pin-holes (holes/500 flexings) | 0 | 21 | 0 | 3 | 15 |

TABLE 2

|  | Example 2 | Comparative Example 4 |
|---|---|---|
| Blending ratio (by weight) | | |
| polyamide resin X | 95 | 100 |
| modified polyester-based elastomer Y | 5 | 0 |
| Thickness (μm) | | |
| gas-barrier layer | 15 | 15 |
| adhesive layer | 3 | 3 |
| sealant (LLDPE) | 50 | 50 |
| Results of Evaluations | | |
| haze value (%/15 μm) | 5.4 | 4.2 |
| oxygen transmission rate (ml/(m² · day · MPa)) | 41 | 38 |
| impact puncture strength (kg · cm) | 21.6 | 17.1 |
| number of pin-holes (holes/500 flexings) | 0 | 10 |

TABLE 3

|  | Example 3 | Comparative Example 5 |
|---|---|---|
| Blending ratio (by weight) | | |
| polyamide resin X | 95 | 100 |
| modified polyester-based elastomer Y | 5 | 0 |
| Thickness (μm) | | |
| layer A | 15 | 15 |
| layer B | 10 | 10 |
| layer C | 20 | 21 |
| total (C/B/A/B/C) | 75 | 77 |
| Results of Evaluations | | |
| haze value (%/15 μm) | 7.7 | 4.2 |
| oxygen transmission rate (ml/(m² · day · MPa)) | 41 | 38 |
| impact puncture strength (kg · cm) | 22.0 | 17.1 |
| number of pin-holes (holes/500 flexings) | 0 | 10 |

TABLE 4

|  | Example 4 | Comparative Example 7 |
|---|---|---|
| Layered structure of film | W/V/W | W/V/W |
| thickness of each layer (μm) | 5/5/5 | 5/5/5 |
| total thickness of film (μm) | 15 | 15 |
| Blending ratio (by weight) | | |
| polyamide resin X (N-MXD6) | 97 | 100 |
| modified polyester-based elastomer Y | 3 | 0 |
| Results of Evaluations | | |
| haze value (%/15 μm) | 2.9 | 2.8 |
| oxygen transmission rate (ml/(m² · day · MPa)) | 73.2 | 71.5 |
| impact puncture strength (kg · cm) | 13.3 | 8.6 |
| number of pin-holes (holes/500 flexings) | 0 | 8 |

What is claimed is:

1. A stretched polyamide film comprising at least one gas-barrier stretched layer which is made of a mixed resin Z containing polyamide resin X and modified polyester-based elastomer Y, and containing from 90 to 98% by weight of the polyamide resin X based on a total weight of the polyamide resin X and the modified polyester-based elastomer Y, and from 10 to 2% by weight of the modified polyester-based elastomer Y based on a total weight of the polyamide resin X and the modified polyester-based elastomer Y, the polyamide resin X being constituted by a diamine constitutional unit comprising 70 mol % or more of m-xylylenediamine unit, of total diamine constitutional units, and a dicarboxylic acid constitutional unit comprising 70 mol % or more of a $C_{6-12}$ α,ω-aliphatic dicarboxylic acid unit, of total dicarboxylic acid constitutional units, and the modified polyester-based elastomer Y being graft-modified with an ethylenically unsaturated carboxylic acid, wherein said gas-barrier stretched layer has a thickness of 5-50 μm.

2. The stretched polyamide film according to claim 1, wherein the gas-barrier stretched layer is formed by melt-extruding the mixed resin Z into a single-layered film and then stretching the single-layered film.

3. The stretched polyamide film according to claim 1, wherein the $C_{6-12}$ α,ω-aliphatic dicarboxylic acid is adipic acid.

4. The stretched polyamide film according to claim 1, further comprising a stretched layer made of an aliphatic polyamide resin on one or both surfaces of the gas-barrier stretched layer.

5. The stretched polyamide film according to claim 4, produced by laminating a gas-barrier stretched film which is obtained by melt-extruding the mixed resin Z and then stretching the extruded mixed resin Z with a stretched film which is separately obtained by melt-extruding the aliphatic polyamide resin and then stretching the extruded aliphatic polyamide resin.

6. The stretched polyamide film according to claim 4, produced by respectively melt co-extruding the mixed resin Z and the aliphatic polyamide resin into a multi-layered film and then stretching the multi-layered film.

7. A multi-layered, gas-barrier film comprising the stretched polyamide film as defined in claim 1 and a stretched or non-stretched thermoplastic resin film.

8. The multi-layered, gas-barrier film according to claim 7, produced by laminating the stretched polyamide film and the stretched or non-stretched thermoplastic resin film which are separately produced.

9. The multi-layered, gas-barrier film according to claim 7, further comprising an adhesive resin film.

10. The multi-layered, gas-barrier film according to claim 9, produced by respectively melt co-extruding the mixed resin Z, the adhesive resin and the thermoplastic resin into a multi-layered film, and then stretching the multi-layered film.

11. A multi-layered, gas-barrier film comprising the stretched polyamide film as defined in claim 4 and a stretched or non-stretched thermoplastic resin film.

12. The multi-layered, gas-barrier film according to claim 11, produced by laminating the stretched polyamide film and the stretched or non-stretched thermoplastic resin film which are separately produced.

13. The multi-layered, gas-barrier film according to claim 11, further comprising an adhesive resin film.

14. The multi-layered, gas-barrier film according to claim 13, produced by respectively melt co-extruding the mixed resin Z, the aliphatic polyamide resin, the adhesive resin and the thermoplastic resin into a multi-layered film, and then stretching the multi-layered film.

15. The stretched polyamide film according to claim 1, wherein the mixed resin Z contains 95 to 97% by weight of polyamide resin X and 5 to 3% by weight of modified polyester-based elastomer Y, each based on the total weight of the polyamide resin X and the modified polyester-based elastomer Y.

16. The stretched polyamide film according to claim 1, wherein the polyester-based elastomer of the modified polyester-based elastomer Y is a saturated polyester-based elastomer having a polyalkylene ether glycol segment.

17. The stretched polyamide film according to claim 1, wherein the polyester-based elastomer the modified polyester-based elastomer Y includes an aromatic polyester segment as a relatively hard segment and a polyalkylene ether glycol or aliphatic polyester segment as a relatively soft segment as compared to said relatively hard segment.

18. The stretched polyamide film according to claim 1, having an oxygen transmission rate of 0-200 ml/($m^2$·day·MPa), and a haze value of 0-8%/15 μm film thickness.

* * * * *